United States Patent
van Dijk

(10) Patent No.: US 8,215,054 B2
(45) Date of Patent: Jul. 10, 2012

(54) FLOOR FOR A CULTIVATION AREA

(75) Inventor: Jacobus Johannes Wilhelmus van Dijk, Pijnacker (NL)

(73) Assignee: Klimrek I.E. B.V., Pijnacker (NL)

( * ) Notice: Subject to any disclaimer, the term of this patent is extended or adjusted under 35 U.S.C. 154(b) by 310 days.

(21) Appl. No.: 10/592,597

(22) PCT Filed: Mar. 10, 2005

(86) PCT No.: PCT/NL2005/000180
§ 371 (c)(1),
(2), (4) Date: Jul. 10, 2007

(87) PCT Pub. No.: WO2005/086989
PCT Pub. Date: Sep. 22, 2005

(65) Prior Publication Data
US 2007/0277452 A1 Dec. 6, 2007

(30) Foreign Application Priority Data
Mar. 12, 2004 (NL) .................................... 1025706

(51) Int. Cl.
*A01G 9/14* (2006.01)

(52) U.S. Cl. .......................................................... 47/17

(58) Field of Classification Search ................ 47/47–18, 47/17–18; 237/69; 52/2.17–2.24, 64, 66, 52/2.22; 777/47–18; 220/567.1
See application file for complete search history.

(56) References Cited

U.S. PATENT DOCUMENTS

| | | | | |
|---|---|---|---|---|
| 2,854,014 A * | 9/1958 | Hasselquist | ................. | 52/2.19 |
| 3,229,429 A * | 1/1966 | Conrad | ................. | 52/2.11 |
| 3,415,719 A * | 12/1968 | Telkes | ................. | 202/83 |
| 3,516,568 A * | 6/1970 | Fish | ................. | 405/55 |
| 4,309,843 A * | 1/1982 | Kato | ................. | 47/18 |
| 4,352,259 A * | 10/1982 | Smith et al. | ................. | 52/2.17 |
| 4,631,873 A * | 12/1986 | Parish | ................. | 52/2.21 |
| 5,852,899 A * | 12/1998 | Finley | ................. | 52/2.24 |
| 6,382,237 B1 * | 5/2002 | Takai | ................. | 137/236.1 |
| 6,874,651 B2 * | 4/2005 | Matiere | ................. | 220/567.1 |
| 2005/0005528 A1 * | 1/2005 | Brault et al. | ................. | 52/63 |
| 2008/0196322 A1 * | 8/2008 | Bouchain et al. | ................. | 52/64 |

FOREIGN PATENT DOCUMENTS

| | | | |
|---|---|---|---|
| DE | 19904759 | * | 8/2000 |
| EP | 25632 A1 | * | 3/1981 |
| EP | 1 090 545 A1 | | 4/2001 |
| EP | 1 090 545 A1 | | 11/2001 |
| NL | 9102059 A | | 7/1993 |
| NL | 1016490 C2 | | 5/2002 |

OTHER PUBLICATIONS

Delhez Translation, EP 0025632.*
Wilhelm Translation, retrieved from EPO Jul. 14, 2009.*

* cited by examiner

*Primary Examiner* — Kristen C Hayes
(74) *Attorney, Agent, or Firm* — The Webb Law Firm

(57) ABSTRACT

A floor for a cultivation area such as a greenhouse. An accommodating hole is excavated in the ground and a flexible holder for liquid such as water is placed therein. The top of said holder is provided with a supporting plate. By varying the level of the supporting plate, the level of the greenhouse floor is varied. The water can contain heat. Optionally there can be a further holder which, for example, contains liquid with different properties, such as a different temperature. A number of such holders can be incorporated in a greenhouse floor.

12 Claims, 2 Drawing Sheets

FLOOR FOR A CULTIVATION AREA

BACKGROUND OF THE INVENTION

1) Field of the Invention

The present invention relates to a floor for a cultivation area, such as a greenhouse floor, having a holder located beneath it with a part facing said floor, which holder can be filled with a fluid.

2) Description of Related Art

Storage of water, both for storing heat and for irrigation, can be implemented both inside and outside a cultivation area, such as a greenhouse. For storage outside a cultivation area use will be made of large tanks if it is heat that is concerned, whilst basins are used for storing water for irrigation purposes.

It is known to store water for irrigation purposes beneath the floor in a greenhouse. As is generally known in the case of stalls and the like, trough-like depressions, preferably made of concrete, are produced and a floor, generally consisting of concrete, is poured over these, on which cultivation can be carried out in some way or other known in the art. As a result the separate basins located outside described above are superfluous, which leaves more space for nature or further cultivation area. Moreover, there is no risk of pollution of the stored water from external sources, which is the case with open basins. Problems with regard to freezing are also prevented.

SUMMARY OF THE INVENTION

The aim of the present invention is to increase the possibilities for application of underground storage further.

This aim is realised with a floor as described above and more particularly the holder, in that said holder is filled with said fluid, the part directly adjoining the part of said holder facing said floor comprises a part that rests on said fluid, and wherein said part of the holder facing said floor comprises a protective support. This part can be rigid or flexible. The fluid described above is preferably a fluid containing water. The fluid can also comprise a fluid with high heat storage capacity, such as by use of materials where a phase transition takes place in the relative temperature range.

According to the invention the floor of the cultivation area, which can be either inside or outside, such as a greenhouse, is formed by the top of the holder. Because the part directly adjoining the top of the holder is made flexible, and preferably the entire holder has a flexible wall, if there are no lateral limits close to the floor of the cultivation area this will behave like a "water droplet". That is to say, within the volume of the holder this will choose a shape that is as flattened as possible. The height of the floor level can be controlled by introducing more or less liquid, such as water, into the holder. Such a floor can support installations and the like.

The top of the holder can be made flexible or rigid. For protection and distribution of the load, according to the invention a protective, optionally plate-shaped support, strip or the like can be fitted. Of course, this plate-shaped support or the like can be the only seal for the fluid at that location, that is to say the terminal wall of the holder is formed exclusively by the support or floor at the location of the floor. As a result there can be direct contact between floor and water. As a result of this concept, numerous further possibilities arise for the underground storage of water. Examples are varying the level of the floor by introducing more or less water into the holder. For this purpose the holder will preferably be provided with feed/discharge openings for the liquid stored. Another example is operation as floor heating/cooling. After all, if the water contains heat/cold a very efficient floor heating/cooling system can be provided by the direct contact with the floor.

It is also possible to influence the climate in the cultivation area or on the cultivation floor in another way. It is possible to provide the support with openings, through which a cooling gas is fed. Such channels do not have to be closed off in the downward direction because in a preferred embodiment of the invention liquid that provides closure is already present.

It is also possible to choose a gas or a mixture of gas and liquid as fluid. As a result it becomes possible not only to provide an underground liquid store that can be implemented in an inexpensive manner, but likewise underground storage of gases, such as $CO_2$. Introduction of the gas can take place when removing the liquid and the removal of the gas can be achieved by introducing more liquid.

The protective support can also support parts of a building construction.

It has been found that with such a floating construction a particularly robust assembly is produced when a suitable supporting plate is used. Although in theory it is sufficient to form the top of the holder using flexible material, by use of a suitable support it is possible to drive over a floor produced in this way with heavy loads, such as fork-lift trucks, without fluctuations and the like being produced.

It must be understood that the construction described above can be implemented by making a hole in the ground and placing the holder therein. Apart from the advantages described above, what is achieved by this means is that the base and side walls of the hole are stabilised by the presence of the flexible holder.

It is also possible to separate the holder from the ground via a floating body. That is to say an upward pressure is exerted on the holder by the groundwater.

However, it is also possible to make no or only a shallow hole, the holder protruding above that level. As a result the floor level in the greenhouse will be higher, but this is not a problem for the majority of types of cultivation because the height of the greenhouse is such that production is not hampered. It can be important that close to the top boundary of the holder, that is to say at the location of the flexible part, the holder is able to move freely without hitting against boundary (walls). This is except for a stop that is used as a safety feature. In particular, if the supporting plate described above is used, it can be advantageous to provide a minimum level. At such minimum level the forces are transmitted from the supporting plate via a separate supporting construction and no longer via the flexible holder or the fluid contained therein.

According to a variant of the present invention, in addition to the holder a further holder is arranged above it or below it (or even alongside it). Such a construction is used mainly if the liquid level in the holder first described has to vary regularly because of feeding/removal of water, for example for watering or heating purposes via conventional heating in the cultivation area or elsewhere. In such a case the floor level would be able to rise or fall in an undesirable manner. By providing a further holder and filling this with water originating from another source, it is possible to compensate for the change in volume of the first-mentioned holder. As a result the aggregate liquid level can remain the same or in any event be varied as desired. For varying the height it is necessary that the side walls of the bags are made flexible. Instead of the two holders described above it is also possible to build up the holder from a number of hoses that are laid in layers on top of one another. Such hoses can be procured at low cost and are easy to install. The level can be controlled by varying the amount of water in the hoses. It is preferable that the part of the holder that is filled with liquid, that is flexible and is located immediately adjacent to the bottom of the greenhouse floor is above a possible liquid level in the accommodating hole in which such a holder is placed. When two or more holders or, alternatively, hoses are stacked on top of one another the holders in one of the lower layers can optionally be filled with a gas or provided with floating bodies.

Such a construction where at least holders located on top of one another are used is particularly suitable for the water/gas combination. A changing amount of water is put into, preferably, the lowermost holder, whilst a changing amount of gas, such as $CO_2$, is present in the uppermost holder. With this arrangement a partition between liquid and gas is not always necessary. However, it is also possible to put a changing amount of gas into the lowermost holder.

Apart from the storage of heat, the holder can also be used for cooling purposes. Especially in the summer months the temperature in, for example, a greenhouse often rises to an unacceptable extent and, in particular, if the aim is for a closed greenhouse, cooling can be important. This can be achieved both via the ground and via other constructions, the use of cooling water being important.

Preferably, the holders are made completely of flexible material in the form of bags. Holders are generally available, for example as sheets of film or bags for storing manure.

According to a further variant of the invention, such holders are supported by partition walls that delimit the entire area in which the holder is located, apart from the top surface, which, as described above, serves as floor. It is possible to arrange a number of such holders located one after the other. If the holders are identical and bear on the same level, it is possible to vary the degree of "bulging" of the holder, and thus to provide different liquid levels, by means of the difference in pressure between the various holders, that is to say the amount of liquid introduced. That is to say, starting from a purely level position, a gradient can be produced and in this way an ebb-and-flow system. Subsequent possible subsidence in the construction has no effect whatsoever because the liquid introduced into the holder will always be level at the floor surface. If a number of such holders are used alongside one another, there will preferably be a common underground "pipe alley" that is to say a trench-shaped space in which the various pipes for supplying/removing liquid can be positioned. Such a space can also be used for installing ventilation ducts therein, which may or may not be supplemented by air conditioning equipment, such as cooling and humidifying/dehumidifying equipment for cooling and humidifying/dehumidifying air/gases and pipes entering the greenhouse.

The holders described above can have large dimensions. A value of 10×60 metres and a depth for the hole of 3 m are mentioned as an example.

The invention also relates to a method for the cultivation of a crop on a floor of a cultivation area, such as a greenhouse floor, comprising a holder installed beneath the floor surface of said greenhouse, wherein liquid is fed to said holder or removed therefrom in order to vary the level of said floor.

As indicated above, it is particularly easy to implement an ebb-and-flow system by means of the present invention, it being possible to work with a very small difference in height. This is advantageous in the case of relatively large greenhouses, which can be tens to hundreds of metres long.

BRIEF DESCRIPTION OF THE DRAWINGS

The invention will be explained in more detail below with reference to an illustrative embodiment shown in the drawing. In the drawing.

DETAILED DESCRIPTION OF THE INVENTION

Figure 1:
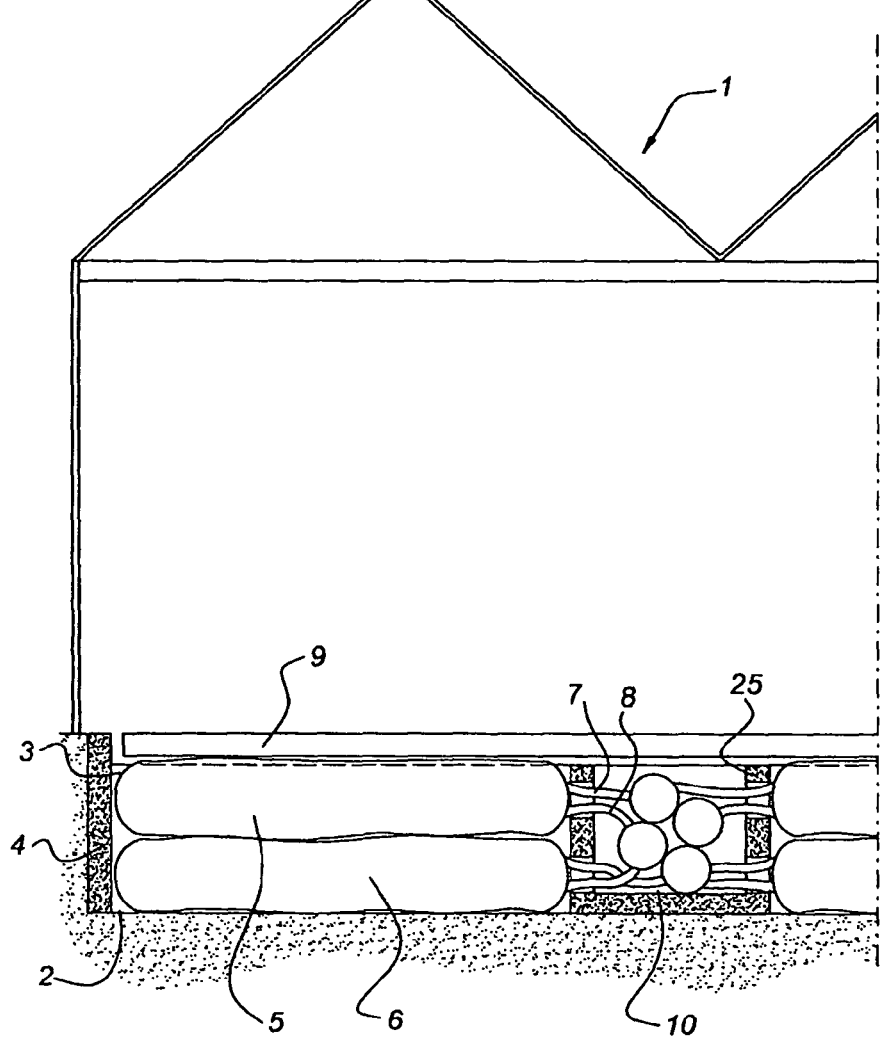
FIG. 1 shows, diagrammatically, a first embodiment of the present invention in side view and partially in cross-section.

In FIG. 1 a cultivation area such as a greenhouse is indicated in its entirety by 1. However, it will be understood that the cultivation area can be constructed in a completely different way.

An excavation 2 has been made therein. This excavation 2 is delimited by, preferably concrete, walls 3 and 4 (see also FIG. 2). Walls 3 can optionally be omitted. As a result trough-shaped chambers are produced. As can be seen from FIG. 1, two holders 5, 6 located one on top of the other have been installed in said chambers. The lower holder 6 is provided with an inlet 7 and an outlet 8 and the same applies for the upper holder 5. Of course, a single connection to the holder can function both as inlet and as outlet. There is a supporting plate 9 on top of the uppermost holder 5. It is possible to integrate holder 5 and supporting plate 9, that is to say that the holder 5 is partly delimited by supporting plate 9.

Furthermore, it is possible to arrange channels in supporting plate 9 that extend parallel to the floor surface, for passing a fluid for heating and/or cooling therethrough. For instance, gas channels can be made, through which, for example, outside air is fed for rapid and simple cooling of the cultivation area or the fluid located beneath it, without this air coming into contact with the interior of the greenhouse. Particularly efficient cooling (heating) can be achieved with a large heating surface. If holder 5 is filled with water it is not necessary to seal the channels on the underside. That is to say the supporting plate 9 can be provided with a pattern of slots on the underside. As a result of the buoyancy of the supporting plate 9, a channel system for a gas is thus produced. Facilities that promote heat exchange, such as liquid sprayers, can be arranged in such gas channels.

Figure 2:
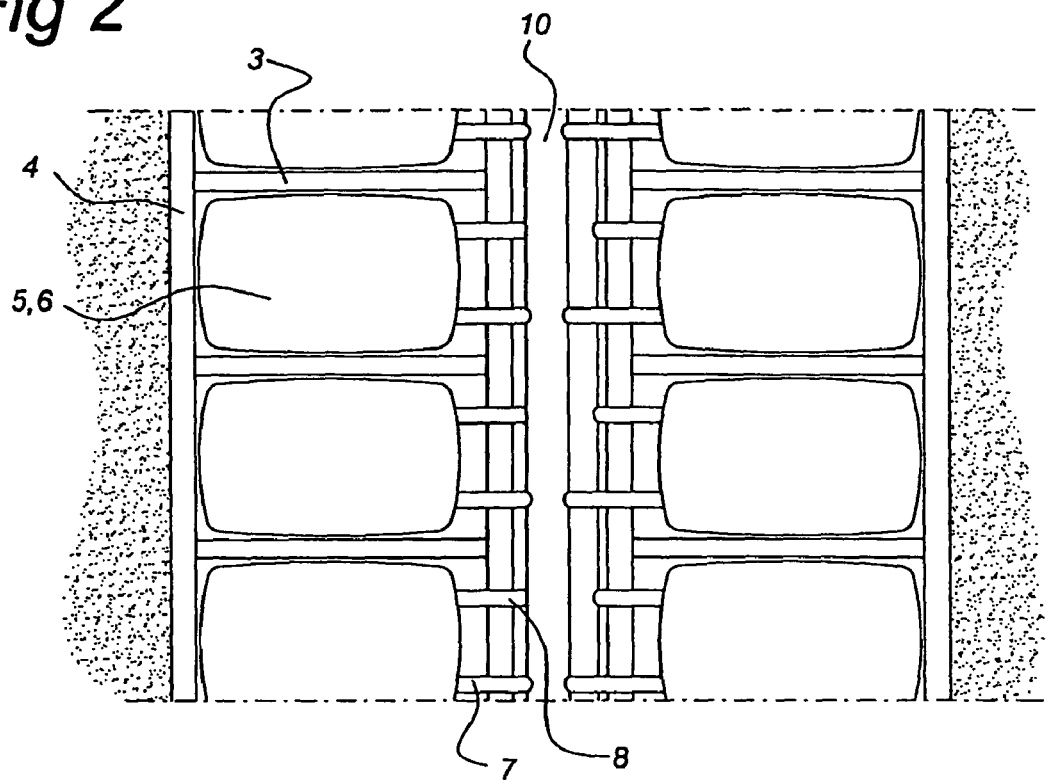
FIG. 2 shows a plan view of part of the construction shown in FIG. 1.

It can be seen from FIG. 2 that there are various series of such holders. Between two series there is a channel 10 that likewise has been dug out beneath the floor level of the greenhouse and in which various pipes are installed. Apart from the pipes mentioned here, pipes for, for example, air conditioning or other purposes can also be installed in channel 10. In the case of air conditioning, there can also be filters and the like.

According to the present invention holder 5 is preferably connected to a hot water system. That is to say, hot water is stored therein, which, for example, is absorbed from the surroundings during the day. Overnight this hot water can be removed again for heating purposes. As a result, the level of the liquid in holder 5 will fall during the day. In order to keep the level of supporting plate 9 constant, additional liquid is fed to the holder 6. When the liquid volume in holder 5 increases again, the liquid volume in holder 6 will reduce. Plate 9 is not able to lower further than the wall of channel 10. This wall acts as a stop. There can also be an upward stop. Heat transfer can take place directly via the supporting plate 9 to the greenhouse, for example via a hose system or the gas channels described above. This applies in particular for cultivation directly on floor 9, such as in the case of the cultivation of pot plants. It is also possible to connect the various facilities with the heating system or cooling system for a greenhouse. Instead of heat, liquid at a low temperature can, of course, also be accommodated in holder 5. There is optionally an insulating layer between holders 5 and 6. Such an insulating layer can also be present between the holder 5 and the supporting plate 9 and/or comprise the floor.

Instead of liquid, the holders can also be filled with a gas, that is to say one or both holders can serve as gas store.

Figure 3:
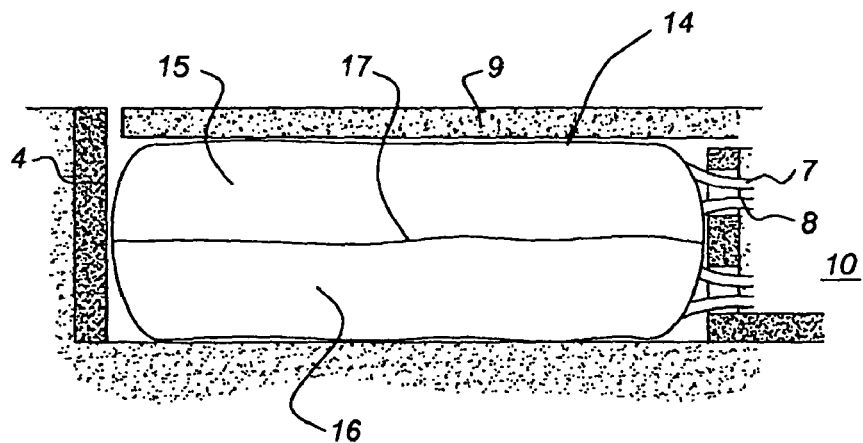
FIG. 3 shows a variant of what is shown in FIGS. 1 and 2.

A variant of the combined holders 5 and 6 as shown in FIG. 1 is shown in FIG. 3. This is indicated in its entirety by 14 and consists of a top compartment 15 and a bottom compartment 16. Each compartment is always provided with an inlet 7 and outlet 8. There is a flexible membrane 17 between the compartments. This membrane 17 preferably has insulating properties. By this means substantially the same effect is achieved as with the structure described above with reference to FIGS. 1 and 2.

By means of the present invention it is not only possible to store water temporarily for heating purposes, but also to store water for irrigation purposes. Water originating from the greenhouse can also be temporarily stored in one of the holders. Furthermore, it is possible to control the level of supporting plate 9 by controlling the amount of liquid in the holders, as a result of which an ebb-and-flow system can be achieved.

It must be understood that in the above liquid is preferably to be understood as water containing known additives. In principle, it is also possible to use other liquids and this applies in particular for holder 6, 16, which has been installed for compensation purposes. A further variant of the present invention is shown in FIG. 4.

Figure 4:
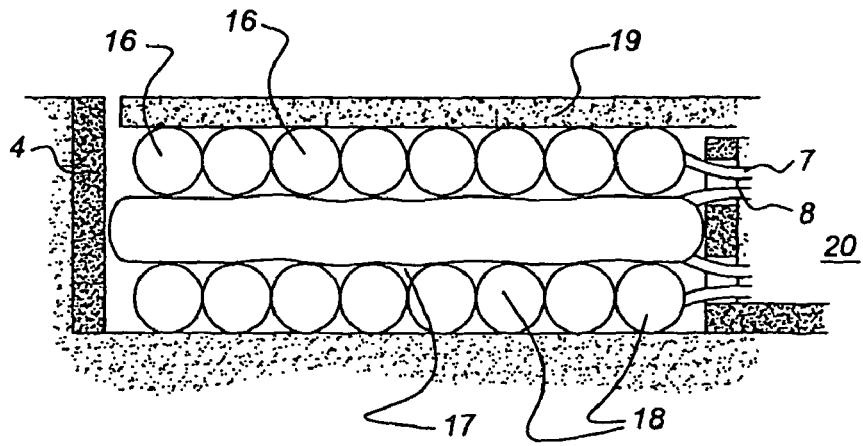
FIG. 4 shows holders built up from hoses.

In FIG. 4 the supporting plate is indicated by 19 and the channel by 20. The supporting plate 19 is supported by holders according to the invention. According to the present invention, these holders consist of hoses 16, which are arranged in a first layer, hoses 17 extending perpendicularly thereto and hoses 18 again extending parallel to the first hoses 16. These can be made of a relatively inexpensive material, such as PE material. Such hoses can easily be taken from a roll and rolled out in a greenhouse. These can be coupled in line with one another so that only a single feed/discharge is necessary. Here again, the level of supporting plate 19 can be varied by increases in pressure or change in volume. It is possible to fill the hoses 17 or 18 with air. By this means the level can be further controlled if the holders are at a level with groundwater.

Although the invention has been described above with reference to a preferred embodiment, it will be understood by those skilled in the art that numerous variants are possible. For instance, it is possible to install the construction described above above ground level. Making the floor partially separate or completely separate from the holder is mentioned as a further possibility. As a result the floor is able to float as a more or less separate float on the fluid, such as water.

The invention claimed is:

1. A floor for a cultivation area, comprising a top surface and a first holder received within a chamber, said first holder being located below the top surface, wherein a top part of the first holder faces an upward direction, wherein the first holder is adapted to be filled with a fluid and is filled therewith, the fluid comprising water, wherein the top part of the first holder is in direct contact with said fluid, and wherein the top part of the first holder comprises a supporting plate engaged therewith, the supporting plate extending completely across the first holder, wherein the holder is configured to control the height of the supporting plate by varying the amount of water in the first holder.

2. The floor according to claim 1, wherein the top part of the holder is rigid.

3. The floor according to claim 1, wherein the top part of the holder is flexible.

4. The floor according to claim 1, wherein the first holder includes a feed or discharge opening for admitting or discharging liquid, and wherein the first holder includes a flexible side wall for varying the height of the supporting plate.

5. The floor according to claim 1, comprising a second holder having a flexible side wall, wherein the second holder is installed below the first holder, wherein the second holder is filled with a liquid and includes a feed or discharge opening, the liquid comprising water.

6. The floor according to claim 1, wherein the first holder includes compartments separated by a flexible partition, wherein each compartment includes an individual feed or discharge opening.

7. The floor according to claim 1, wherein the chamber comprises a hole beneath the top surface.

8. The floor according to claim 1, further comprising a plurality of holders, each constructed substantially similarly to the first holder, and wherein the plurality of holders are arranged alongside one another.

9. The floor according to claim 8, further comprising a channel defined adjacent to non-abutting sides of the holders, wherein the channel is sized to accommodate respective feed or discharge lines for carrying fluid into or out of the respective holders, wherein the channel includes parts of an air conditioning installation.

10. The floor according to claim 8, wherein at least one channel is located beneath the supporting plate of the first holder.

11. The floor according to claim 1, wherein the supporting plate comprises a plate-shaped support.

12. The floor according to claim 1, wherein the cultivation area is a greenhouse.

* * * * *